(12) United States Patent
Murphy et al.

(10) Patent No.: US 6,529,877 B1
(45) Date of Patent: Mar. 4, 2003

(54) EQUIPMENT ALLOCATION SYSTEM

(75) Inventors: Raymond John Murphy, Canterbury (GB); David Don Milne, Maidstone (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/091,740

(22) PCT Filed: Mar. 18, 1998

(86) PCT No.: PCT/GB98/00818

§ 371 (c)(1),
(2), (4) Date: Jun. 24, 1999

(87) PCT Pub. No.: WO98/44439

PCT Pub. Date: Oct. 8, 1998

(30) Foreign Application Priority Data

Mar. 27, 1997 (EP) .............................................. 97302190

(51) Int. Cl.$^7$ .............................................. G06F 17/60
(52) U.S. Cl. ............................................. 705/7; 700/97
(58) Field of Search ........................ 705/8, 7; 707/104, 707/104.1; 706/45; 700/99, 100, 104, 105–107, 97; 717/171, 172, 116, 177; 709/220–224

(56) References Cited

U.S. PATENT DOCUMENTS

| | | | | |
|---|---|---|---|---|
| 4,992,940 A | * | 2/1991 | Dworkin | 364/401 |
| 5,067,148 A | * | 11/1991 | Sardana | 379/111 |
| 5,121,330 A | * | 6/1992 | Blaha et al. | 364/468 |
| 5,148,370 A | * | 9/1992 | Litt et al. | 700/104 |
| 5,231,567 A | * | 7/1993 | Matoba et al. | 364/401 |
| 5,260,866 A | * | 11/1993 | Lisinski et al. | 364/401 |
| 5,287,267 A | * | 2/1994 | Jayaraman et al. | 364/403 |
| 5,369,570 A | * | 11/1994 | Parad | 705/8 |
| 5,381,332 A | | 1/1995 | Wood | |
| 5,515,524 A | * | 5/1996 | Lynch et al. | 703/13 |
| 5,517,566 A | | 5/1996 | Smith et al. | |

(List continued on next page.)

FOREIGN PATENT DOCUMENTS

| | | | |
|---|---|---|---|
| JP | 406082082 A | * | 3/1994 |
| WO | 9616365 | | 1/1997 |

OTHER PUBLICATIONS

Shannon, Terry. "DEC's Knowledge Engineers Improve In–House Efficiency." DEC User, p. 39, Jul. 1989.*

Shade, J. J. et al. "Scheduling Installations in the Telecommunications Industry." European Journal of Operational Research. Oct. 1, 1997.*

(List continued on next page.)

Primary Examiner—Tariq R. Hafiz
Assistant Examiner—Susanna Meinecke-Diaz
(74) Attorney, Agent, or Firm—Nixon & Vanderhye P.C.

(57) ABSTRACT

When installing equipment in a complex system such as a telephone exchange, there are often a variety of possible solutions to the problem faced by the planner, using different types of equipment and providing different capabilities, e.g. spare capacity or extra capabilities. Not all personnel will necessarily be familiar with all types of equipment, which can have a practical limit on the installations an individual can work on. To overcome this, a planning system is disclosed which stores information relating to equipment types suitable for providing the different types of functionality required, and also stores information relating to the availability of such equipment types, and generates proposals for providing the functionality according to the availability and suitability of each equipment type. These may be ranked by cost, complexity, availability of components, or other criteria. The system also stores data relating to the current configuration of equipment in service, updating it according to proposed changes suggested by the system and confirmed by the user. A facility may be provided to modify this record if ad hoc changes to the proposal are made on-site.

17 Claims, 4 Drawing Sheets

U.S. PATENT DOCUMENTS

| | | | | |
|---|---|---|---|---|
| 5,546,595 | A | * | 8/1996 | Norman et al. ............... 703/21 |
| 5,564,109 | A | * | 10/1996 | Snyder et al. ................. 399/8 |
| 5,596,502 | A | * | 1/1997 | Koski et al. .................. 700/95 |
| 5,619,695 | A | * | 4/1997 | Arbabi et al. ............... 709/104 |
| 5,668,995 | A | * | 9/1997 | Bhat .......................... 703/23 |
| 5,717,865 | A | * | 2/1998 | Stratmann ................... 395/210 |
| 5,737,494 | A | * | 4/1998 | Guinta et al. ................. 395/10 |
| 5,761,063 | A | * | 6/1998 | Jannette et al. ............... 700/97 |
| 5,787,246 | A | * | 7/1998 | Lichtman et al. ........... 709/220 |
| 5,875,242 | A | * | 2/1999 | Glaser et al. .......... 379/115.01 |
| 5,920,846 | A | * | 7/1999 | Storch et al. ............ 379/15.03 |
| 5,930,769 | A | * | 7/1999 | Rose .......................... 345/419 |
| 6,195,643 | B1 | * | 2/2001 | Maxwell ..................... 705/10 |
| 6,360,139 | B1 | * | 3/2002 | Jacobs ........................ 235/381 |

OTHER PUBLICATIONS

Information about "EasiMatch Evaluation Management System." Retrieved from the Internet <URL: http://www.easimatch.com> Copyright 2001.*

Weston, Jeffrey M. "The Information Factor: Information Integration." Quality. vol. 28, No. 3, p. 16 (start page), Mar. 1989.*

"Computer–aided Process Planning", IBM Technical Disclosure Bulletin, vol. 37, No. 4B, Apr. 1, 1994, pp. 605–607, XP000451370.

* cited by examiner

EQUIPMENT ALLOCATION SYSTEM

FIELD OF THE INVENTION

This invention relates to a system for the allocation of equipment in a complex installation such as a telephone exchange.

DESCRIPTION OF RELATED ART

In a telephone exchange, physical resources have to be allocated to the provision of functionality in support of services to new customers, or new or modified services to existing customers whose requirements have changed. Such services include basic telephony, broad-band connections, for example Integrated Services Digital Network (ISDN) provision having a specified bandwidth, etc. In a modern installation the resource typically takes the form of a so-called "card", for example in order to provide the necessary functionality to interface a customer's connection with a trunk carrier, including any multiplexing, analogue/digital conversion, or other functions, which may be required. The basic arrangement of a typical installation is illustrated in FIG. 4. The equipment is arranged in a modular hierarchy, thereby allowing changes to be made readily. Each card is allocated a "slot" 30 in a "shelf" 31 which in turn is located on a "rack" 32, for which floor space must be provided in the exchange 33. Each level in this hierarchy can be configured to accommodate equipment at the next level. Each slot 30 has an electrical or other connection 34 to a distribution frame 35 (generally known as an OFF (optical fibre frame), or DDF (digital distribution frame) according to the nature of the signals they handle) through which connection 36 can be made to an external communications link 37. Each element also has a connection 38 to a power supply 32. The power equipment rack 32 is typically installed with a suite of racks, the shelves and slots being connected up to the power supply 39 as they are fitted.

Although the design philosophies of most systems are modular, not all equipment types are compatible. For example, some equipment is designed to operate with optical fibre technology, and other equipment with electrical signals (e.g. coaxial cable connections). Even within the same technology type, the cards of one manufacturer are not, in general, compatible with the shelves of another.

Records systems exist which record the location and use (e.g. wiring connections) of cards, racks, shelves and floor space and these are consulted and updated as appropriate, as equipment is installed or modified. The planning process for changes in such utilization, including data capture of the changes implemented, are essentially manual, although data storage itself may be electronic.

There are several problems with the existing systems. Firstly, there are often a number of different types of technology available to an equipment planner which are all capable of providing the required service. This can be because of historic reasons, for instance a recent change in supplier, or a deliberate policy of multiple sourcing of equipment in order to reduce vulnerability to supply problems.

In existing systems, it is necessary for the individual carrying out the planning task to select the type of equipment for which space must be found, and this in turn requires that the planner be familiar with all possible solutions to the task he has been given. However, an individual planner may not be experienced in all the possible methods of satisfying the particular requirement with which he is confronted, and may choose a non-optimal solution with which he happens to be familiar. For example, his chosen solution may require installation of new equipment, when some equipment of different design, already installed but currently spare, could have been used to achieve the same objective.

In many situations there are planning rules which have been developed in order to optimize the usage of resources. For example if cards are available providing either 2, 4 or 16 circuits, and the immediate requirement is for 6 circuits, this can be satisfied by providing one 16-circuit card, two 4-circuit cards, three 2-circuit cards, or one 2-circuit card and one 4-circuit card. In general the selection of one of these options will take into account the costs of the individual card types, the availability of individual card types, and the perceived likelihood that the spare capacity in the first two of these options could be taken up at some future date. For example, if rack space is in short supply at the location in question the first option (one 16-circuit card) may be preferred because it only requires one slot, despite the greater complexity, and therefore greater cost, of the card involved, since this will allow provision of a further ten circuits at some future date without using any further rack space.

However the application of such rules, and the use of different technology types, requires that the human planner carrying out the process be familiar with all the possible solutions, and all the planning rules relating to those solutions. In particular, because of the need to minimize the amount of stored equipment to be maintained at individual locations, and to ensure that the technical staff responsible for installation and maintenance of the equipment are familiar with the equipment in their care, the different types of technologies are very often concentrated in different geographical locations. However, this means that the planning effort must also be geographically compartmentalized to allow the planners to be familiar with the technology in use. This makes it difficult to accommodate localized variations in demand for new services.

BRIEF SUMMARY OF THE INVENTION

According to the present invention there is provided an apparatus for allocating equipment of a plurality of types for installation to provide service functionality of predetermined types, each equipment type being suitable for at least one of the service functionality types, and there exists at least one such service functionality for which a plurality of the equipment types are suitable. The apparatus comprises means for storing information relating to the suitability of each equipment type for providing each service functionality type; means for storing information relating to the availability of each equipment type; and means for generating, from the stored information, one or more proposals for installation of equipment to provide required service functionality according to the availability and suitability of each equipment type.

According to another aspect, there is provided a method of allocating equipment of a plurality of types for installation to provide service functionality of predetermined types, each equipment type being suitable for at least one of the service functionality types, and there existing at least one such service functionality for which a plurality of the equipment types are suitable; the method comprising the steps of:

using a suitably programmed computer to store information relating to the suitability of each equipment type for providing each type of service functionality;

using the computer to store information relating to the availability of each equipment type, and using the computer to retrieve the stored information to generate one or more proposals for installation of equipment to provide required service functionality according to the availability and suitability of each equipment type. As the invention is capable of operating with information relating to a plurality of different technical solutions to a given problem, it is particularly suited to a generic, technology-independent, approach in which information relating to the various technical equipment types can be added or modified without changing the underlying program.

By maintaining the data according to the service functionality to be provided, rather than the equipment type itself, all technical options capable of meeting the functionality requirement can be presented to the planner. The planner can therefore be presented with technical options with which he may not be familiar, either because the equipment with which he is familiar is not available, or because in particular circumstances (e.g. a location where he is not normally involved) the type of equipment already installed differs from that with which he is familiar.

The planner may be presented with more than one proposal, according to a predetermined prioritization process. The planner can override the prioritization process, for example if the proposal requires equipment for which there is a long lead time and the task requires to be met in less time, or vice versa. In such cases the selection of a proposal other than the highest-ranked proposal may be flagged, in order to allow a supervisor to monitor such exceptions.

A further problem with the prior art manual system is that data capture is based on the changes proposed by the planner, but the installation process itself may differ if the installation technician is unable to carry out the installation as planned. This may be, for example, because of non-availability of the proposed card type, or difficulty in installing it as instructed. The technician may improvise in order to provide the functionality required, but unless such variations are reported back to the planning database they will go unrecorded. This, in turn, makes the database inaccurate, making it more likely that future installation tasks cannot proceed as proposed by the planners, for example because a slot recorded as free has been used in an earlier improvisation.

When one of the proposals is selected, it is therefore desirable that the information on the availability of resources is updated to take account of the provisional allocation of those resources to the installation that has now been planned. Instructions to carry out the installation would then be sent to a field technician in order to actually carry it out. In some cases a field technician will find it impractical to carry out the installation in the manner in which the planner has requested it. This may be because of an unexpected unavailability of equipment, or because the existing records are inaccurate. In such circumstances, it is desirable that the field technician can record either that the installation has been performed as planned, so that the provisional allocation can be made fixed, or to record that some alternative manner of carrying out the installation has been performed. Typically such a change might be the insertion of the required card in a slot in the equipment rack other than the slot provisionally allocated to it, because of a malfunctioning connection in the allocated rack. pending its repair, the faulty slot may also be recorded as being out of order, to prevent further proposals being made to use it.

Preferably the apparatus also has a provision for inspecting and retrieving the stored information relating to the current utilization and configuration of the equipment. This allows individual circuits or other system elements in the system to be traced. The apparatus may also comprise means for monitoring the availability of equipment types suitable for a provision of a specified service functionality, thereby providing a facility for forward resource planning, for example, by monitoring the spare capacity of particular resources suitable for providing a specified functionality, thereby assisting planning of procurement, installation of new capacity, or repair of existing faulty capacity. Alerting means may be provided for generating an alert when such availability reaches a predetermined threshold.

The storage means may include means for storing historic data on the availability of resources, in association with means for determining from the historic data the rate at which such resources are being used, for example to predict when availability of a resource type will reach a predetermined value, and allow procurement to be planned accordingly, or to adjust the planning rules to be weighted towards use of alternative resource types capable of performing equivalent functionality. If the historic data indicates that utilization of a particular equipment type at a given location is declining, this may allow its removal, to allow its re-use elsewhere, or to make the resources on which that equipment in turn relies (e.g. space, power supply), available for alternative uses.

The generic design approach allows these functions to be carried out generally, rather than separately for each type of equipment in use.

The invention is preferably embodied as a program running on a general purpose computer.

BRIEF DESCRIPTION OF THE DRAWINGS

The invention will now be further described with reference to the accompanying drawings in which.

DETAILED DESCRIPTION OF THE INVENTION

Figure 1:
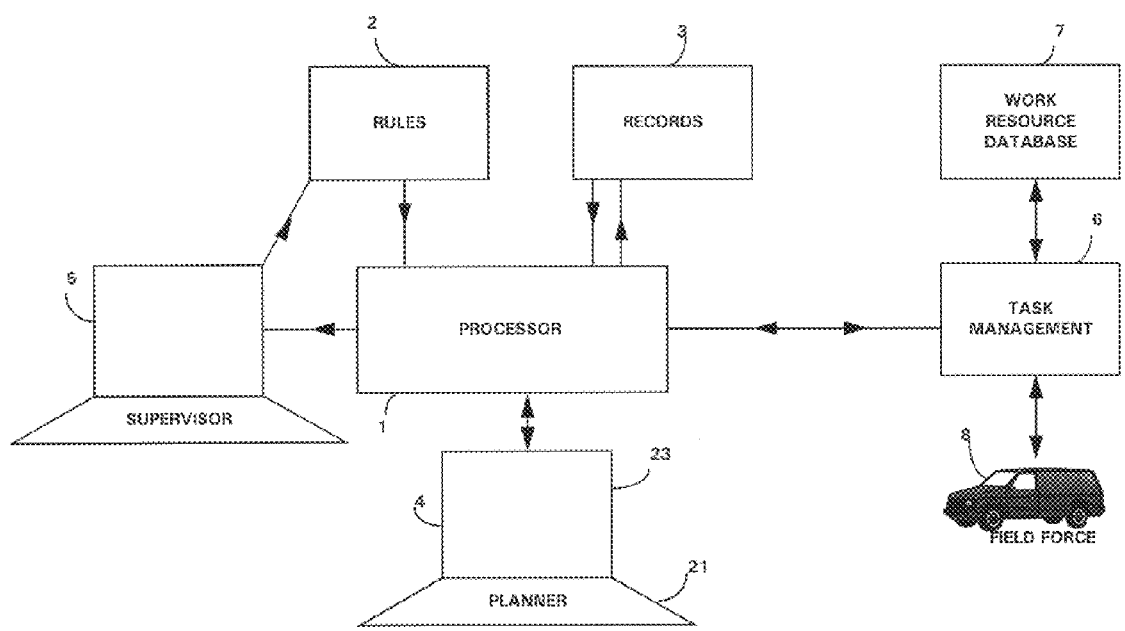
FIG. 1 is a functional block diagram showing the various elements of the apparatus.

FIG. 1 shows a central processing unit 1, which has various inputs and outputs to process the data required. In particular, there are associated data stores for storing the basic planning rules (store 2) which control the operation of the system, and a records store (3), which stores the current configuration of the equipment, (including provisional allocations, as will be discussed).

The processor has human interfaces with the planning personnel (interface 4) and there is also a supervisory function though another human interface (5).

There is also an interface with a task management system 6, of the kind described in detail in International Patent Specification WO96/26535. Such a system itself has access to a database (7), and to the members of a field force 8.

It should be noted at this point that the planning interface 4 may be operated by the field force 8, the link between the planning interface 4 and the processor 1 being by means of a suitable remote access telecommunications link, for example a modem connected to a PSTN (Public Switched Telephone Network), cellular radio, or ISDN (Integrated Services Data Network) connection. Alternatively, the planners 4 may be linked to the processor 1 by a permanent Local area network (LAN) or similar.

The invention may be implemented in software for running on a general-purpose computer and may, for example, be based on network infrastructure management software available from Accunet Ltd of Votec House, Hambridge Lane, Newbury, Berkshire, RG14 5TN, England, using the "Euclid" Computer Aided Design (CAD) drafting engine produced by Matra of France.

Figure 2:
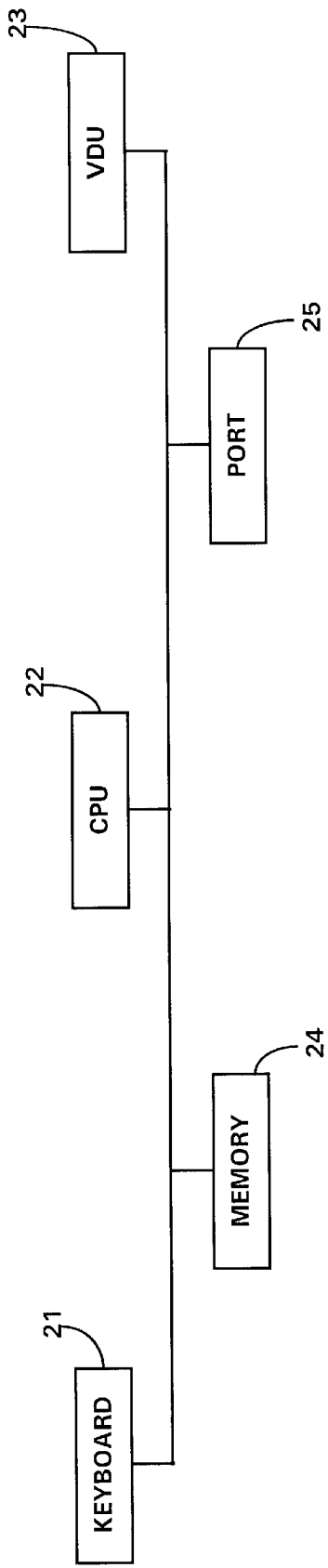
FIG. 2 shows the basic elements of the computing system 1.

The basic components of such a computer and its ancillaries 1 are shown in FIG. 2. These comprise one or more keyboards 21, a central processing unit (CPU) 22, one or more visual display units (VDU) 23, a memory 24 and an input/output port 25. The data and the programs for controlling the computer are stored in the memory 24.

Figure 3:
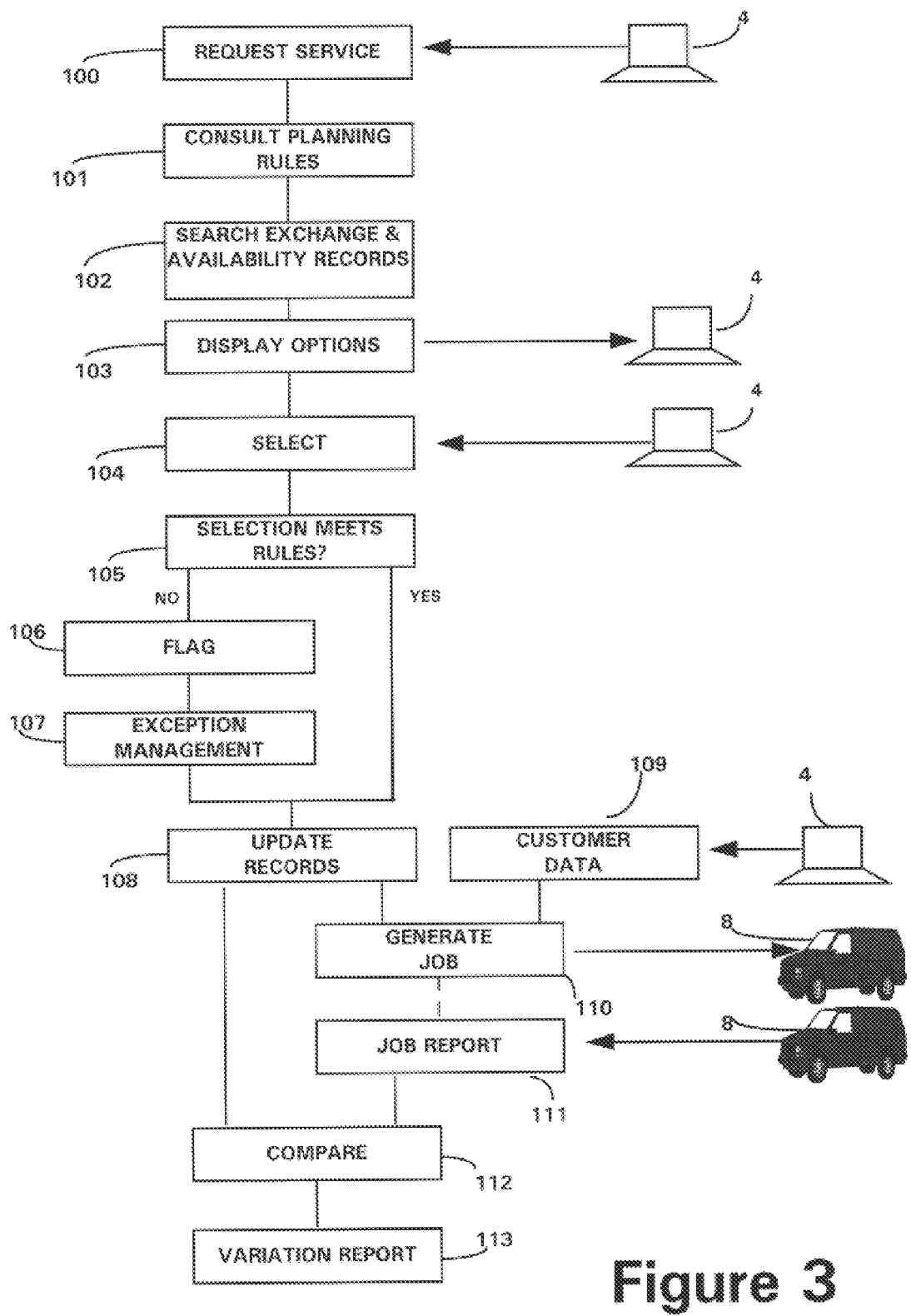
FIG. 3 is a flowchart showing the process by which the system operates.
Figure 4:
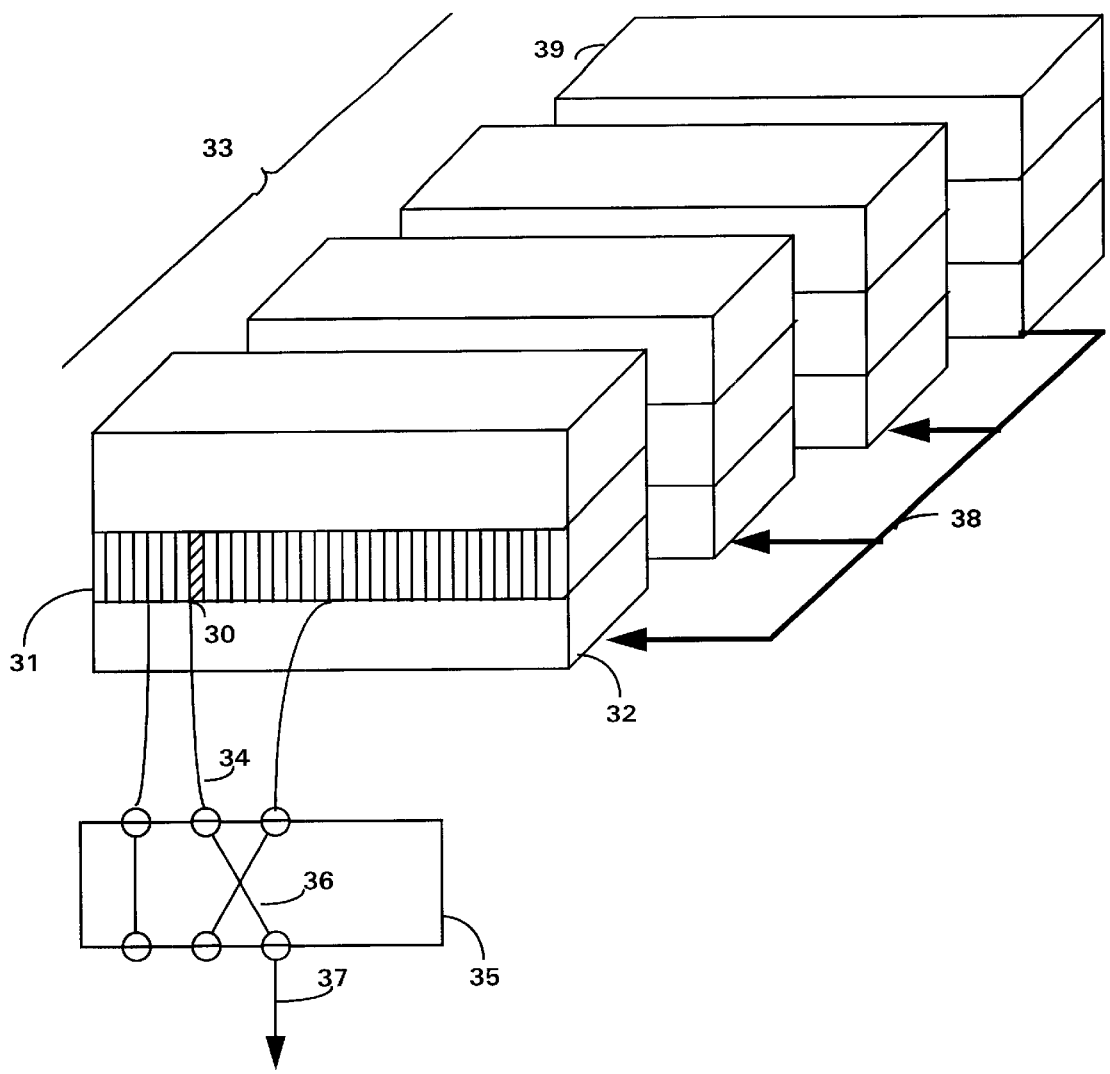
FIG. 4 illustrates the basic hierarchy of equipment in a telephone exchange installation, as has already been discussed.

The operation of the system will be now be described in detail with particular reference to FIGS. 1 and 3. In general use, planning personnel will process a request for the provision of new network capacity, by means of the human interface 4, which will typically be a screen and keyboard or other data entry means. Initially the system planner inputs data (step 100) relating to the service required. Typically this will indicate capacity (bandwidth) of the required connection, and the exchange in which the capacity is to be installed. The processor 1 then uses the planning rules stored in memory 2 (step 101) and the records of equipment utilization in the relevant exchange, stored in the records store 3, to generate and display one of more possible ways of providing the functionality requested (step 103). For example these options may utilise equipment of different manufacture, which because of its different design must be installed in different parts of the exchange. Sub-optimal options may be included in the options displayed. Typically, the proposals might be listed in the following order:

1. Solutions which utilize a card which is already installed in a wired slot but has free capacity.
2. Solutions which utilize a vacant slot which is already wired, but for which a new card must be supplied.
3. Solutions which utilize a vacant slot which will require wiring.
4. Solutions for which no slot is available, requiring installation of a new shelf in an existing rack.
5. Solutions which require installation of a complete new rack.

Availability of equipment may affect this prioritization. For example, for solutions 2 and 3 the type of card required must be compatible with the shelf type. If no such card is available, or is not available in the timescale demanded by the customer, it may be necessary for the planner to select a different solution, despite the extra work involved. The capability of the power supply 39 to handle the extra load is also assessed, and solutions which require modification of the power supply are given a lower priority than otherwise.

The interface between the processor 1 and the task management system 6 allows availability of resources to perform the task (derived from the work resource database 7), and information relating to the nature of the requested task (received by the task management system 6 from the processor 1) to be reported back to the processor 1, allowing the user of the planning interface 4 to be given an indication as to whether the task that he has requested can be carried out within the timescales that he requires. The records system 3 also indicates whether availability of the equipment for any of the options would result in a delay in installation, and the planner can also take this into account.

The planner is able to select any of the options displayed. For example if the planning rules require that for the type of service requested two 2 Mbit/s capacity cards should be provided. However, the same capacity could be provided by a single 4 or 16 Mbit/s card, and it may be preferable to carry out the latter course as it involves less work on-site or because available slots are in short supply. The extra cost of providing overcapacity, (e.g. a 16 Mbit/s card where only 4 Mbit/s are required) may be justified to anticipate projected expansion of the requirements of the customer, or because the lower capacity card is not available. Conversely, the additional work required to install two cards instead of one higher capacity card may be justified if the high capacity card is unavailable, or unsuitable for the slot available, or requires modification of the power supply to that slot. By being offered several options, the planner can decide which option is preferred in the present circumstances.

The planner selects (step 104) one of the options using his interface equipment 4. The processing system 1 then checks whether the selection is the one which is deemed optimum under the planning rules (step 105), If it is not, the selection is flagged (step 106) and reported to an exception management system forming part of the supervisory system 5 (step 107). The exception management system identifies the number and rate of occurrence of such exceptions, in order that a supervisor can ensure that the planning rules are being adhered to or, if too many exceptions are being noted, whether this can be justified. This in turn may indicate that the planning rules need amendment in the light of experience.

The selected option is passed to the records store 3 in order to update the records of the utilization of equipment. This is to ensure that an attempt is not made subsequently to allocate the same equipment to another service request. The data regarding the selection is also transmitted to the task management system 6, which allocates the task to a member of the field force 8, (step 110) in accordance with the availability of the field force and its own allocation rules. This requires inputting of the relevant customer data by the planner (step 109) in order to provide the necessary information to provide the service to the correct incoming connection to the exchange. The task management system 6 draws on a work resource database 7, and updates it as tasks are allocated, in order to schedule the operation of such tasks to members of the field force 8. Such processes are described in detail in the present applicant's International Patent Specifications WO95/26535 and PCT/GB97/03118.

When the installation is being performed the member of the field force 8 relays details to the task management system 6, which in turn returns details to the processor 1. It is possible that the data on the records system 3 differs from the installation task that was actually performed. This may be because of the failure of a component which was to be installed, (or which was already installed and was to have been brought into service), or it may be because of inaccurate data capture in the past. For this reason the field technician reports the task as it was actually carried out (step 111). This is compared (step 112 with the information generated in step 108 which was the provisional allocation of the equipment. If the comparison 112 identifies any differences, the variation report 113 is transmitted to the monitoring system 5, and the database 3 is amended to reflect the actual, as distinct from the provisional allocation. If the task is carried out as originally proposed, then the record 3 is simply changed from "provisional" to "actual".

The planner, or other users of the system, may also access the records database 3 to inspect the existing installation, for example to inspect individual circuits or other system elements. The equipment-independent design of the system allows this to be done without prior knowledge of the type of equipment used. The system may also be used for forward resource planning. For example, the processor 2 may monitor the records database 3, and alert the supervisor 5 if the availability of a particular resource, or resources, suitable for performing a specified task, falls below a threshold value. The generic approach allows the thresholds to be set according to functionality, rather than equipment type, which allows availability of one equipment type to fall very low without raising an alert, provided suitable alternatives are available. The processor 2, or the records system 3, may store sufficient historic data to monitor the rate at which resources are being used, thus allowing impending shortages to be predicted more accurately. For example, the system may alert the supervisory function when either the number of spare equipments of a given type falls to a predetermined threshold. The system may also extrapolate, from recent, utilization rates, the time it will take for the number of spare equipments of a given type to fall to zero. By comparing this with the lead time required to obtain more stock, a warning can be given when these values become comparable. If the number of spare equipments at a given location are increasing, this may, also be alerted, to allow redistribution of the equipment elsewhere, or rationalization of the resources at a given location. For example, if two similar shelves are each under-utilised it may be possible to concentrate all their cards in one shelf, allowing the other shelf to be replaced by a shelf of different type.

The availability information may be used to modify the planning rules stored in the rule store 2, so that if a first equipment type capable of use for a number of tasks is in short supply, but some of those tasks can be performed by an alternative equipment type, such tasks are allocated that alternative type in preference to the first type, so that the first type can be reserved for tasks for which only the first type is suitable.

The system has been described with particular reference to telephone exchange (switching centre) equipment. However, the planning tool is equally applicable to customer-end equipment or in-line electronic equipment (i.e. intermediate connection points). At such locations there is typically very little available space, and therefore the planning rules for such installations should ensure that maximum use is made of the facilities already in place. In particular, a mixture of incompatible equipment, made by different manufacturers, may be acceptable at an exchange, as it makes available more ways of meeting a customer requirement, and also makes the installation process more robust to supply problems. However, such duplication is less likely to be justified in a smaller installation such as at a customer site.

By providing the planning personnel with a range of valid options it can be ensured that the planning criteria are more closely adhered to without the necessity of all planning personnel being familiar with all exchanges, and with the different technologies (e.g. from different manufacturers) operable in each. This allows the more efficient use of physical resources, as the optimum equipment for each service request is made available whilst allowing the planning personnel to be more versatile.

What is claimed is:

1. Apparatus for allocating equipment of a plurality of types for installation to provide service functionality of predetermined types in a pre-existing installation, each equipment type being suitable for at least one of the service functionality types, and at least one such service functionality exists for which a plurality of the equipment types are suitable, the apparatus comprising:

means for storing information relating to the suitability of each equipment type for providing each service functionality type;

means for storing information relating to the pre-existing installation;

means for storing information relating to the availability of each equipment type;

means for generating, from the stored information, a plurality of proposals for installation of equipment in the pre-existing installation to provide required service functionality according to the availability and suitability of each equipment type and the information relating to the pre-existing installation; and means for ranking the plurality of generated proposals according to predetermined planning rules based on the suitability of the equipment types, means for allowing a user to select one of the proposals and means for recording the selection of a proposal other than the highest ranked proposal.

2. Apparatus according to claim 1, comprising means for monitoring the availability of equipment types suitable for provision of a specified service functionality.

3. Apparatus according to claim 2, wherein the storage means includes means for storing historic data on the availability of resources, further comprising means for determining, from the historic data, a rate at which such resources are being used.

4. Apparatus according to claim 2, further comprising alerting means for generating an alert when a property related to such availability of resources reaches a predetermined threshold.

5. Apparatus for allocating equipment of a plurality of types for installation to provide service functionality of predetermined types in a pre-existing installation, each equipment type being suitable for at least one of the service functionality types, and at least one such service functionality exists for which a plurality of the equipment types are suitable, the apparatus comprising:

means for storing information relating to the suitability of each equipment type for providing each service functionality type;

means for storing information relating to the pre-existing installation;

means for storing information relating to the availability of each equipment type;

means for generating, from the stored information, a plurality of proposals for installation of equipment in the pre-existing installation to provide required service functionality according to the availability and suitability of each equipment type and the information relating to the pre-existing installation;

means for ranking the plurality of generated proposals according to predetermined planning rules based on the suitability of each equipment type;

means for allowing a user to select one of the proposals, and means for updating the availability information in response to such selection.

6. Apparatus for allocating equipment of a plurality of types for installation to provide service functionality of predetermined types, each equipment type being suitable for at least one of the service functionality types, and at least one such service functionality exists for which a plurality of the equipment types are suitable, the apparatus comprising:

means for storing information relating to the suitability of each equipment type for providing each service functionality type;

means for storing information relating to the availability of each equipment type;

means for generating, from the stored information, a plurality of proposals for installation of equipment to provide required service functionality according to the availability and suitability of each equipment type;

means for ranking the plurality of generated proposals according to predetermined planning rules based on the suitability of each equipment type;

means for allowing a user to select one of the proposals, and means for updating the availability information in response to such selection; and means for recording an actual installation, means for comparing the installation actually carried out with the selected proposal for installation, and means for modifying the availability information if the actual and proposed installations differ.

7. Apparatus according to claim 6, comprising means for recording occurrences of installation performance in which actual performance differs from the proposed performance.

8. Apparatus according to claim 4, comprising means for inspecting stored information relating to the performed installations, such that information relating to the current utilization of the equipment can be retrieved.

9. A method of allocating equipment of a plurality of types for installation to provide service functionality of predetermined types in a pre-existing installation, each equipment type being suitable for at least one of the service functionality types, and at least one such service functionality exists for which a plurality of the equipment types are suitable; the method comprising the steps of using a programmed computer to:

store information relating to the suitability of each equipment type for providing each type of service functionality;

store information relating to the pre-existing installation;

store information relating to the availability of each equipment type, and retrieve the stored information to generate a plurality of proposals for installation of equipment in the pre-existing installation to provide required service functionality according to the availability and suitability of each equipment type and the information relating to the pre-existing installation;

wherein said proposals are ranked according to a predetermined prioritization process which is based on the suitability of the equipment type.

10. A method according to claim 9 comprising the further steps of:

allowing a user to select of one the installation proposals; and recording the selection of an installation proposal other than the highest ranked installation proposal.

11. A method according to claim 9, comprising the further step of updating the availability information in response to selection of one of the installation proposals.

12. A method according to claim 9, wherein the availability of equipment types suitable for providing a specified service functionality is monitored.

13. Method according to claim 12, wherein historic data on the availability of resources is stored, the rate at which such resources are being used is determined from the historic data.

14. Method according to claim 12 wherein an alert is generated when a property related to such availability reaches a predetermined threshold.

15. A method of allocating equipment of a plurality of types for installation to provide service functionality of predetermined types, each equipment type being suitable for at least one of the service functionality types, and at least one such service functionality exists for which a plurality of the equipment types are suitable; the method comprising the steps of using a programmed computer to:

store information relating to the suitability of each equipment type for providing each type of service functionality;

store information relating to the availability of each equipment type, retrieve the stored information to generate a plurality of proposals for installation of equipment to provide required service functionality according to the availability and suitability of each equipment type;

rank the plurality of generated proposals according to predetermined planning rules based on the suitability of each equipment type;

update the availability information in response to selection of one of installation proposals;

record the actual performance of the proposed installation;

compare the installation actually carried out with the selected proposal for installation; and modify the availability information if the actual and proposed installations differ.

16. A method according to claim 15 comprising the further step of recording occurrences of installation in which actual performance of the installation differs from the proposed installation.

17. Method according to claim 15, wherein information relating to the current utilization of the equipment is retrieved by inspecting stored information relating to the installations performed.

\* \* \* \* \*